Patented Oct. 4, 1938

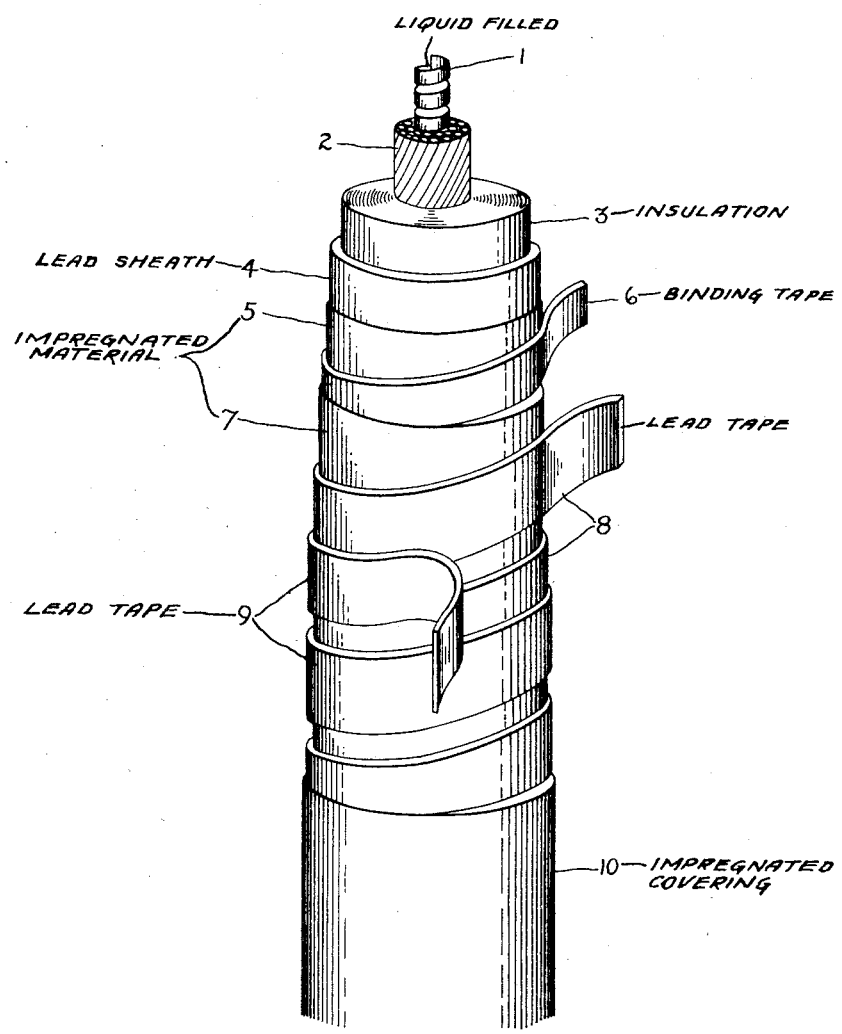

2,132,259

UNITED STATES PATENT OFFICE 2,132,259

ELECTRIC CABLE

Luigi Emanueli, Milan, Italy, assignor to Società Italiana Pirelli, a corporation of Italy Application May 31, 1935, Serial No. 24,429
In Italy June 2, 1934

1 Claim. (Cl. 173—266)

The present invention refers to electric cables having an external metal tape reinforcement on the lead sheath capable of rendering the sheath resistant to the pressures which exist inside the cable, and has for its object a particular protection of the reinforcement against outside chemical agents.

Inside the cable are often present, due to the variations of load, high pressures due to the expansion of the impregnating medium, thick or liquid, of the insulation. Inside the cable, especially in cables filled with oil or other insulating liquid, there is a pressure greater than the atmospheric, which rises to considerable values under certain conditions. So that the lead sheath may have a greater resistance to the inside pressure, thus preventing its deformation, a metal tape reinforcement is generally used, which consists in windings of metal tape having a high tensile strength.

The reinforcement must, in turn, be protected from outside agents, such as chemical or electrolytic action. Up till the present time a second unitary lead sheath has been used for this purpose. The application of this second lead sheath, however, is expensive due to the amount of metal required. Further, in the case of oil-filled cables, a second passage through the lead press is necessary after the cable has been filled with oil, which operation is rather complicated.

The impregnation of the insulation on the conductor with oil after the first sheath is applied and before the second, is due to the fact that the first sheath has to be tested for imperfections. This is commonly done by subjecting the interior of the sheath to the effects of a high vacuum.

The above disadvantages are eliminated by the present invention, according to which the reinforcement formed by a winding of metallic tape of high tensile strength is covered by a winding of tape, which can resist the external chemical action such as lead for example.

In a cable manufactured according to the present invention the lead sheath may be covered with paper or textiles impregnated with bitumen or tar. On this is wound the metal tape constituting the reinforcement, this tape being of a metal having a sufficiently high tensile strength, such as brass, and therefore capable of rendering the sheath resistant to the maximum internal pressures which may occur in the cable and so prevent the deformation thereof. After the reinforcement has been covered with other bitumened or tarred paper or textiles, one or more lead tapes, of the same width and thickness as those of the ordinary iron armouring of cables, are wound on. It is preferable that two of these lead tapes be wound, both in the same direction and one over the other so that the second tape covers the gaps left between the adjacent turns of the first. A final covering of paper and bitumened or tarred textiles completes the cable.

The attached drawing represents, as an example, an oil-filled cable to which the present invention has been applied.

In this drawing 1 is a central oil duct made of a spirally wound metal ribbon, 2 the stranded conductor applied over said duct, 3 the insulation such as tightly wrapped paper, and 4 a unitary lead sheath; 5 and 7 indicate windings of tarred paper and 6 a brass tape forming the reinforcement, said tape being located over one of the windings and under the other; 8 and 9 indicate two lead tapes which protect the reinforcement according to the present invention, and 10 an external covering comprising one or more layers of textile material, each layer of which is impregnated with tar or other suitable material which is highly resistant to moisture and other foreign matter.

The protection of the reinforcement by means of lead tapes has proved in practice to be as efficient as a second lead sheath and has the advantage of being more practical and economical. All the complications met with in oil-filled cables in making a second passage through the lead press of the cable already filled with oil and provided with the reinforcement are avoided.

A smaller quantity of lead is also used, the cost of the cable being consequently reduced as it is possible to draw and wind round the cable thin tapes of lead, whilst when adopting a lead sheath the minimum thickness of the sheath is necessarily always greater than that of the two strips together. A reduction in weight is also obtained.

There is further also a reduction in the energy losses due to the currents induced during service, and consequently less heating of the cable as the two lead tapes have a higher electrical resistance than a unitary second lead sheath would have.

It is clear that the present invention is applicable to all types of cables inside of which there is, either temporarily or permanently, a high pressure, and when it is desirable that said pressure shall not deform the lead sheath.

The present invention is of particular importance, however, in the case of oil-filled cables where the pressure, as said above, rises to very high values and is never lower than a certain value which is higher than the atmospheric pressure.

What I claim as new and desire to secure by Letters Patent of the United States, is:

An electric cable comprising a single conductor having a central duct, insulation on the conductor, a filling of liquid for the duct which impregnates the insulation, said liquid expanding with increases of temperature of the cable, a unitary lead sheath snugly fitting over the insulation and capable of stretching with rise of pressure of the liquid as it expands under operating conditions, a covering of impregnated material surrounding the lead sheath, a strong metallic binding tape smoothly wound over said covering to render the sheath resistant to internal pressures, a covering of impregnated material surrounding said strong metallic tape, lead tapes wound around the last named covering, said tapes being wound in the same direction in overlapping relation with the outer tape covering the spaces between the edges of the turns of the inner tape and serving as a protection for said binding tape against external chemical action, and an impregnated protective covering for the lead tapes.

LUIGI EMANUELI.